United States Patent Office 3,542,893
Patented Nov. 24, 1970

3,542,893
TERTIARY AMYLENE RECOVERY
Frederick D. Foster, East Alton, Ill., assignor to Shell Oil Company, New York, N.Y., a corporation of Delaware
No Drawing. Filed Sept. 23, 1968, Ser. No. 761,823
Int. Cl. C07c 11/02
U.S. Cl. 260—677     3 Claims

ABSTRACT OF THE DISCLOSURE

In the countercurrent multistage sulfuric acid extraction of tertiary amylenes from hydrocarbon streams, wherein the hydrocarbon feed to an extraction zone contains at least 80% by weight of other closely boiling hydrocarbons, the absorption efficiency in said extraction zone is improved by adding a minor amount of fat acid (sulfuric acid containing tertiary amylenes) to said extraction zone.

BACKGROUND OF THE INVENTION

It is generally known that $C_4$–$C_5$ tertiary olefins can be removed from hydrocarbon streams containing the same and other closely boiling $C_4$–$C_5$ hydrocarbons by contacting the stream with an aqueous sulfuric acid solution of suitable concentration at low temperatures for sufficient time to selectively absorb the tertiary olefins from the hydrocarbon phase into the acid phase. Following the separation of the fat sulfuric acid from the remaining hydrocarbon feed stream the tertiary olefins can be recovered from the fat acid by various methods, including reversion-extraction therefrom as by contact with an inert different boiling hydrocarbon at elevated temperatures as disclosed by U.S. 2,958,715 of Sanford, issued Nov. 6, 1960, and U.S. 3,250,820 of Duthie, issued May 10, 1966. For economic reasons, such processes generally require hydrocarbon feed mixtures containing at least about 20% to 50% by weight of tertiary amylenes. Consequently, there are difficulties in recovering tertiary $C_5$-olefins from hydrocarbon feed streams containing low concentrations of the tertiary olefins, e.g., less than 20% by weight, in an economical manner.

Moreover, in some instances prior processes suffer from the disadvantage of forming tenacious emulsions which are to be avoided. For example, U.S. 3,119,882 of Whittle et al., issued Jan. 28, 1964, purposes the use of lecithin to minimize the formation and increase of interfacial emulsions and U.S. 3,222,413 of Woicik et al., issued Dec. 7, 1965, and U.S. 3,254,135 of McCarthy et al., issued May 31, 1966, propose the use of mats of polyethylene fibers and of polyethylene particles, respectively, to break emulsions of hydrocarbon and sulfuric acid.

SUMMARY OF THE INVENTION

It has now been found that tertiary amylenes present in narrow boiling range hydrocarbon streams in amounts of up to only 20% by weight can be efficiently absorbed from the hydrocarbon stream into essentially fresh or lean sulfuric acid of sufficient concentration by intimately contacting the hydrocarbon stream and the sulfuric acid in the presence initially of an added minor amount of a fat acid solution, i.e., a sulfuric acid solution containing 10% to 30% by weight of tertiary amylenes. In some unknown manner the addition of about 0.01%–5% volume (basis acid phase) of the fat acid quickly results in the formation of a desirable emulsion of the hydrocarbon phase as minute droplets dispersed throughout a portion of the acid phase. The formation of this dispersion coincides with a substantial increase in the efficiency of absorption of the tertiary olefins from the hydrocarbon phase into the acid phase without lengthy mechanical mixing.

DESCRIPTION OF PREFERRED EMBODIMENTS

The process of the invention is generally applicable to the selective separation of tertiary amylenes from $C_4$–$C_6$-hydrocarbon streams wherein the concentration of the tertiary amylene is too low for its efficient absorption into the acid phase. The process is particularly advantageously applied to the selective separation of tertiary amylenes from admixture with other closely boiling $C_4$–$C_6$ hydrocarbons, including other olefins, wherein the tertiary amylenes are present in low concentrations of about up to 20% by weight, preferably from about 5% to about 15% by weight. By way of illustration, an essentially $C_5$-boiling range fraction, obtained from the catalytic cracking of a straight-run gas oil fraction, containing about 15.7% wt. $C_4$ hydrocarbons, 0.4% wt. $C_6$ hydrocarbons, 62.3% wt. pentanes, 19.4% amylenes (including 14.1% tertiary amylenes) and 2.2% diolefins is suitably employed.

Generally, the sulfuric acid employed in the process is of about 55% to about 70% by weight concentration, preferably of about 60% to about 65% by weight. The sulfuric acid is suitably fresh or alternatively the acid is lean acid, i.e., the acid recovered after the tertiary amylene has been removed during reversion, as by stripping the fat acid in an inert solvent at elevated temperatures. Lean acid may contain a minor residual amount, e.g., about 2% by weight, of tertiary amylenes as well as small amounts of other hydrocarbon impurities. The hydrocarbon feed/acid volume ratio can vary considerably but an approximately 50:50 ratio is suitably employed.

The fat acid employed to provide dispersion of the hydrocarbon phase into the acid phase generally contains about 5% to about 30% by weight of tertiary amyl alcohols (tertiary amylene expressed as amyl alcohol). The fat acid employed is obtained from the sulfuric acid extraction of tertiary amylenes present in hydrocarbon streams, e.g., hydrocarbon streams containing 20% to 50% by weight tertiary amylenes, or is suitably prepared by contacting substantially pure tertiary amylenes and an aqueous sulfuric acid solution. Generally, the sulfuric acid employed to prepare the fat acid is of at least 50% by weight concentration, although about 55% to 70% by weight sulfuric acid is preferred.

As the fat acid employed in the process of the invention is suitably prepared from substantially pure tertiary amylene and sulfuric acid, it is convenient in some instances to prepare the fat acid in situ with a portion of the sulfuric acid feed, as by adding the required amount of tertiary amylenes to an intimately contacted mixture of hydrocarbon feed and sulfuric acid or by adding the tertiary amylene to a portion of the sulfuric acid prior to contacting of the sulfuric acid and the hydrocarbon feed.

Only a minor amount of fat acid is required to effect the improved absorption of the tertiary amylenes. For example, amounts of fat acid of from about 0.01% to about 5.0% volume, preferably about 0.1% to about 1.0% volume, based on the acid phase is sufficient to give emulsions which break, i.e., separate into a sharp hydrocarbon phase and an acid phase, in excess of 5 minutes. For efficient absorption of the tertiary amylenes from the hydrocarbon phase into the acid phase, the emulsion break time is generally between about 5 to 30 minutes. Accordingly, when the emulsion breaks in less than 5 minutes, a measured sample of fat acid is added to the extraction zone. Emulsion break times are normally measured by determining the settling time of a sample of emulsion in a sight device such as a level glass.

It should be appreciated that the amount of tertiary amylenes (principally in the form of tertiary amyl alcohol) supplied in the fat acid is small in comparison to the total amount of tertiary amylenes in the hydrocarbon feed or even in the lean acid (if fresh acid is not employed). Although it is not known with certainty, it is possible that the fat acid functions as a natural emulsifier due in part to the presence of a high localized concentration of tertiary amylenes which serves to initiate emulsification. Other products in small amounts resulting from interactions of hydrocarbon components and the acid, such as diolefin conversion products, are likely to contribute to the improvement. Consequently, it has been found that it is essential to the successful operation of the process of the invention to avoid substantially diluting the fat acid prior to contacting with an intimately contacted mixure of hydrocarbon feed and sulfuric acid. For example, in a modification wherein the hydrocarbon feed and sulfuric acid is contacted in a batch reactor, it is desirable to add the fat acid in a single batch to an agitated mixture of the hydrocarbon feed and sulfuric acid. Similarly, in a modification wherein the hydrocarbon feed and sulfuric acid are contacted continuously, as by contacting by suitable countercurrent flow or concurrently by means of a mixing pump and circulating lines, it is desirable to add the fat acid in increments to maintain the reqired emulsion break times.

In any modification, the contacting of the hydrocarbon feed and sulfuric acid is conducted at temperatures of from about 0° F. to about 100° F. and at substantially atmospheric pressures, e.g., from about 0 p.s.i.g. to about 100 p.s.i.g.

To further illustrate the process of the invention, the following examples are provided. It should be understood that the details thereof are not to be regarded as limitations, as they may be varied as will be understood by one skilled in this art.

EXAMPLE

A series of plant runs was conducted with periodic injections of fat acid to a mixture of hydrocarbon feed and sulfuric acid to maintain stable emulsions, and the absorption efficiencies of these runs were compared with previous runs conducted without the addition of fat acid. A raffinate hydrocarbon stream (from prior partial acid extraction of the $C_5$-hydrocarbon feed identified below in Table II) containing 9.7% by weight of tertiary amylenes was employed in each run. Feed rates to the contactor were 5000 bbl./day hydrocarbon and 5000 bbl./day of about 60% by weight lean acid containing about 1-2% wt. of tertiary amylenes with contactor temperatures of 35-45° F. In runs 3-6 (Table I) a sample of fat acid (containing about 10% by weight of tertiary amylenes) from a downstream contactor (in a three-stage counterflow operation utilizing a mixer-settler pair in each stage with acid and hydrocarbon flowing countercurrently through the stages and fresh hydrocarbon feed entering at the first stage and lean plus make-up acid at the last stage) was periodically (about every two weeks) added to the contactor to maintain the emulsion break time in excess of 5 minutes. The absorption efficiency, i.e., the percentage of the tertiary amylene in the hydrocarbon feed absorbed into the acid phase, and the amount of fat acid added are tabulated in Table I. Absorption efficiency is calculated from the difference in composition of the hydrocarbon phase as determined by analysis of the amount of tertiary amylenes in the residual hydrocarbon stream and the amount of tertiary amylenes in the hydrocarbon feed. The composition of the hydrocarbon feed stream (first stage feed), the fat acid stream (extract from first stage) and the raffinate hydrocarbon stream contaning 9.7% by weight of tertiary amylenes are tabulated in Table II.

TABLE I

| Run | Fat acid, percent vol. based on lean acid | Absorption efficiency, percent |
|---|---|---|
| 1 | None | 14.2 |
| 2 | None | 14.1 |
| 3 | 0.1-1.0 | 43.0 |
| 4 | 0.1-1.0 | 45.0 |
| 5 | 0.1-1.0 | 46.5 |
| 6 | 0.1-1.0 | 45.0 |

TABLE II

| Components | $C_5$-hydrocarbon feed stream, percent v. | Fat acid stream, percent | | Raffinate hydrocarbon stream, percent | |
|---|---|---|---|---|---|
| | | W. | V. | W. | V. |
| Tertiary amylene | 32.9 | 10.3 | 21.0 | 9.7 | 1.3 |
| $C_4$ hydrocarbons | 4.6 | | | 5.7 | 6.2 |
| $C_5$ hydrocarbons | 37.9 | | | 50.0 | 51.3 |
| $C_6$ hydrocarbons | 3.9 | | | 5.9 | 5.2 |
| Other amylenes | 20.7 | | | 28.6 | 28.0 |
| Diolefins | Trace | | | | |

I claim as my invention:

1. In a process of separating tertiary amylenes from hydrocarbon feed mixtures consisting essentially of from about 5% to 20% by weight of tertiary amylenes and also other closely boiling essentially $C_5$ hydrocarbons by selective absorption in aqueous sulfuric acid of from 55% to 70% by weight concentration and subsequent separation of the resulting hydrocarbon and sulfuric acid mixture into a fat acid phase and a hydrocarbon raffinate phase, the improvement which comprises intimately contacting the hydrocarbon feed and lean sulfuric acid from prior use in a cyclic absorption and regeneration process of tertiary amylene recovery, said lean acid containing a minor residual amount of dissolved tertiary amylenes, and, when they are initially contacted, contacting the mixture with from 0.1% to 5.0% by weight based on the lean acid phase of added fat sulfuric acid of 55% to 70% by weight concentration and containing 10% to 30% by weight of tertiary amylenes, said concentration of tertiary amylenes in the added fat acid being greater than in the fat acid separated from the hydrocarbon feed and said added fat acid serving as an emulsifier to obtain stable emulsions with break time in excess of 5 minutes.

2. The process of claim 1 wherein the fat acid is present in amounts from about 0.1% to about 1% volume based on the sulfuric acid phase.

3. The process of claim 1 wherein the added fat acid is sulfuric acid of at least 60% by weight concentration.

References Cited

UNITED STATES PATENTS

| 2,958,715 | 11/1960 | Sanford et al. | 260—677 |
| 3,150,201 | 9/1964 | Edwards et al. | 260—677 |
| 2,968,682 | 1/1961 | Crouse et al. | 260—677 |

FOREIGN PATENTS

| 948,584 | 2/1964 | Great Britain. |

DELBERT E. GANTZ, Primary Examiner

J. M. NELSON, Assistant Examiner